(12) United States Patent
Sakane et al.

(10) Patent No.: US 9,607,646 B2
(45) Date of Patent: Mar. 28, 2017

(54) HARD DISK DOUBLE LUBRICATION LAYER

(71) Applicant: WD Media, LLC, San Jose, CA (US)

(72) Inventors: Yasuo Sakane, San Jose, CA (US); Kim Thuy Thi Lai, San Jose, CA (US); Shaun H. Chen, Cupertino, CA (US); Bing-Shiuan Chang, San Jose, CA (US)

(73) Assignee: WD MEDIA, LLC, San Jose, CA (US)

( * ) Notice: Subject to any disclaimer, the term of this patent is extended or adjusted under 35 U.S.C. 154(b) by 0 days.

(21) Appl. No.: 14/196,760

(22) Filed: Mar. 4, 2014

(65) Prior Publication Data
US 2015/0036240 A1   Feb. 5, 2015

Related U.S. Application Data (60) Provisional application No. 61/859,938, filed on Jul. 30, 2013.

(51) Int. Cl.
*G11B 5/725*   (2006.01)

(52) U.S. Cl.
CPC .................... *G11B 5/725* (2013.01)

(58) Field of Classification Search
CPC ...................................... G11B 5/725
See application file for complete search history.

(56) References Cited

U.S. PATENT DOCUMENTS

| | | |
|---|---|---|
| 5,331,487 A | 7/1994 | Gregory et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |

(Continued)

*Primary Examiner* — Holly Rickman
(74) *Attorney, Agent, or Firm* — Foley & Lardner LLP (57) ABSTRACT

Systems and methods are illustrated for manufacturing hard disks with double lubrication layers that allow minimization of a HDD head DFH touchdown point while maintaining good tribology performance for HDD reliability. An exemplary hard disk includes a magnetic recording layer, a carbon overcoat, and a double lubrication layer: a bonded lubrication layer and a mobile lubrication layer. The bonded lubrication layer includes a high conformity and high density first lubricant. The mobile layer include a high lubricity lubricant that promotes HDI reliability.

17 Claims, 8 Drawing Sheets

(56) References Cited

U.S. PATENT DOCUMENTS

| | | | |
|---|---|---|---|
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,627,302 | B1* | 9/2003 | Tang et al. .................. 428/212 |
| 6,628,466 | B2 | 9/2003 | Alex |
| 6,663,971 | B1 | 12/2003 | Falcone |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,778,353 | B1 | 8/2004 | Harper |
| 6,795,274 | B1 | 9/2004 | Hsieh et al. |
| 6,800,349 | B2 | 10/2004 | Ma et al. |
| 6,855,232 | B2 | 2/2005 | Jairson et al. |
| 6,857,937 | B2 | 2/2005 | Bajorek |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,060,377 | B2* | 6/2006 | Liu et al. .................. 428/833.4 |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2* | 8/2007 | Shimokawa et al. ......... 428/833 |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,354,666 | B2 | 4/2008 | Liu et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,670,695 | B2 | 3/2010 | Wakabayashi et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,772,172 | B2 | 8/2010 | Liu et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |
| 8,101,054 | B2 | 1/2012 | Chen et al. |
| 8,125,723 | B1 | 2/2012 | Nichols et al. |
| 8,125,724 | B1 | 2/2012 | Nichols et al. |
| 8,137,517 | B1 | 3/2012 | Bourez |
| 8,142,916 | B2 | 3/2012 | Umezawa et al. |
| 8,163,093 | B1 | 4/2012 | Chen et al. |
| 8,171,949 | B1 | 5/2012 | Lund et al. |
| 8,173,282 | B1 | 5/2012 | Sun et al. |
| 8,178,480 | B2 | 5/2012 | Hamakubo et al. |
| 8,206,789 | B2 | 6/2012 | Suzuki |
| 8,218,260 | B2 | 7/2012 | Iamratanakul et al. |
| 8,247,095 | B2 | 8/2012 | Champion et al. |
| 8,257,783 | B2 | 9/2012 | Suzuki et al. |
| 8,298,609 | B1 | 10/2012 | Liew et al. |
| 8,298,689 | B2 | 10/2012 | Sonobe et al. |
| 8,309,239 | B2 | 11/2012 | Umezawa et al. |

(56) References Cited

U.S. PATENT DOCUMENTS

| | | |
|---|---|---|
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2005/0282045 A1* | 12/2005 | Sonoda .................... 428/843.5 |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0222276 A1 | 9/2012 | Guo et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

* cited by examiner

Fig. 2C-1  $R_{f1}$: $(Rc)$—F
(fluorine)

Fig. 2C-2  $R_{f2}$: $(Rc)-\overset{\overset{F}{|}}{\underset{\underset{F}{|}}{C}}-F$ Fig. 2C-3  $R_{f3}$: $(Rc)$-CH2CF2O-(CF2CF2O)m-(CF2O)n-CF2CH2-  (m, n = 5 ~ 25)

Fig. 2D-6    Re6: (Rf)— O-CH2-CH-CH2-O——OCH3
                              |
                              OH

HARD DISK DOUBLE LUBRICATION LAYER

CROSS-REFERENCE TO RELATED APPLICATIONS

This application claims the benefit of U.S. Provisional Application Ser. No. 61/859,938, filed Jul. 30, 2013, which is incorporated herein by reference in its entirety.

BACKGROUND

In magnetic storage devices such as hard disk drives (HDD), read and write heads are used to magnetically read and write information to and from the storage media. In a HDD, data is stored on one or more disks in a series of adjacent concentric circles. A HDD comprises a rotary actuator, a suspension mounted on an arm of the rotary actuator, and a slider bonded to the suspension to form a head gimbal assembly. In a traditional HDD, the slider carries a read/write head, and radially floats over the recording surface of the disk under the control of a servo control system that selectively position the head over a specific track of the disk.

During read and write operations, the head moves adjacent to the recording surface of the disk at the Head Disk Interface (HDI) in preparation for performing read and write operations. During this movement, intermittent contact between the head and disk surface may occur at the HDI, particularly at low fly heights (FH) between the flying head and the rotating disk. The conventional disk includes a conventional carbon overcoat to protect the magnetic recording layer of the disk and a conventional lubrication layer on the carbon overcoat to prevent the head from crashing. More recently, the conventional read/write head also includes a dynamic flying height (DFH) adjust to control the FH. The DFH adjust acts by lowering the head portion of the slider to the disk by applying thermal actuation during read and write operations.

With areal recording densities rapidly increasing on the HDD, however, the FH continues to decrease, approaching sub 1 nm ranges. This decrease in FH decreases the available spacing margin for the slider. Even slight pitches or roll angles of the slider at this FH result in head-disk contacts. Accordingly, it is desirable to manufacture a hard disk with a lubrication layer that increases the DFH touch-down power by minimizing the spacing between the disk head and disk surface while maintaining good tribology performance.

BRIEF DESCRIPTION OF THE DRAWINGS

The present application is illustrated by way of example, and not limitation, in the figures of the accompanying drawings in which:

FIGS. 2A through 2D-6 illustrate molecular structures for exemplary lubricants that may be used as the lubricant in the bonded lubrication layer of the hard disk of FIG. 1.

FIGS. 3A through 3B-6 illustrate molecular structures for exemplary lubricants that may be used as the lubricant in the mobile lubrication layer of the hard disk of FIG. 1.

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. By contrast, a first layer "on" a second layer is in contact with that second layer. Additionally, the relative position of one layer with respect to other layers is provided assuming operations are performed relative to a substrate without consideration of the absolute orientation of the substrate.

In accordance with the present disclosure, systems and methods are illustrated for manufacturing hard disks with double lubrication layers that allow minimization of the DFH touchdown point while maintaining good tribology performance for HDD reliability. These benefits are achieved by providing two lubrication layers comprising different lubricant materials to maximize the separate functions of: 1) conformity and 2) durability and mobility. The disclosed hard disks may be implemented in a high storage density HDD that includes a DFH adjust. In one embodiment, the disclosed hard disk may be implemented in a heat-assisted magnetic recording HDD.

Figure 1:
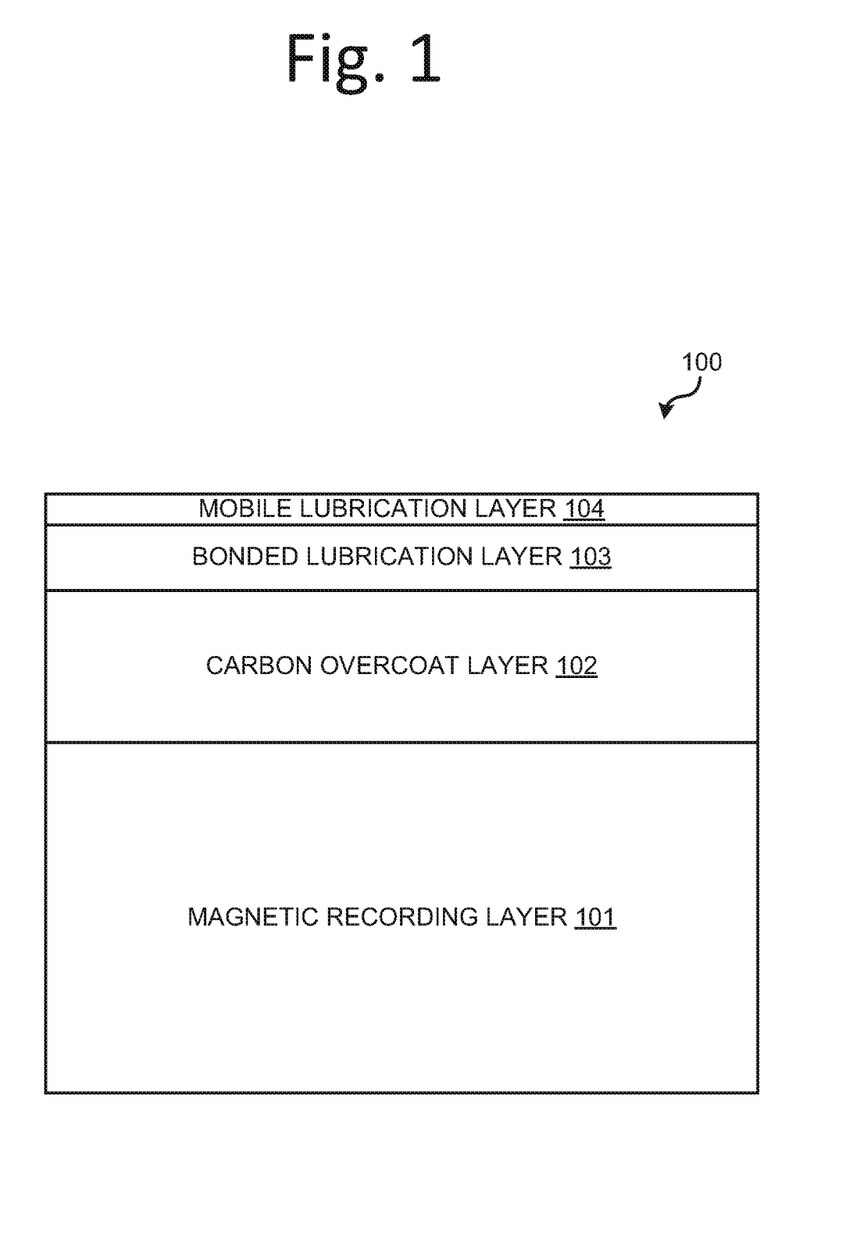
FIG. 1 is a schematic diagram illustrating a lubricated hard disk in accordance with the present disclosure.
Figure 2A:
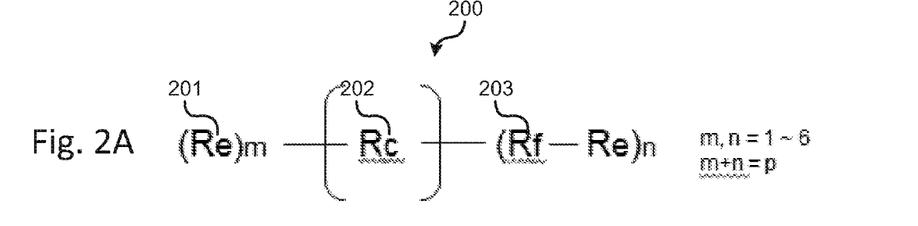
Figure 2B:
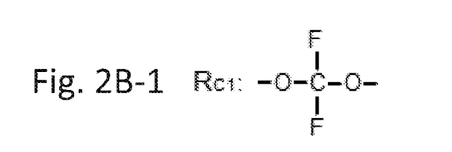
Figure 2B:
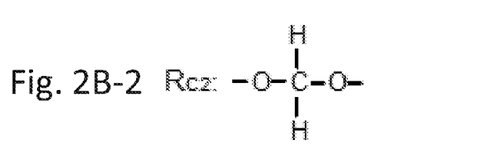
Figure 2B:
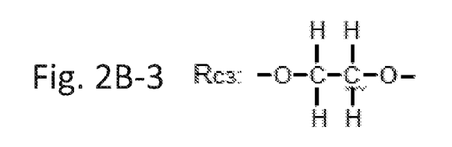
Figure 2B:
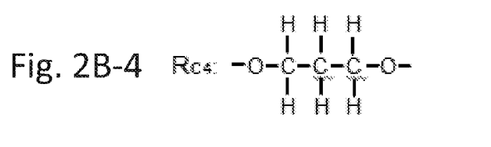
Figure 2B:
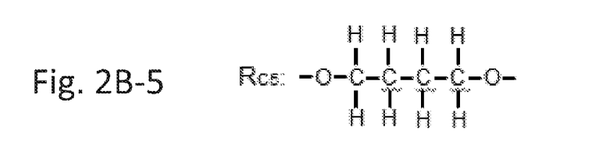
Figure 2B:
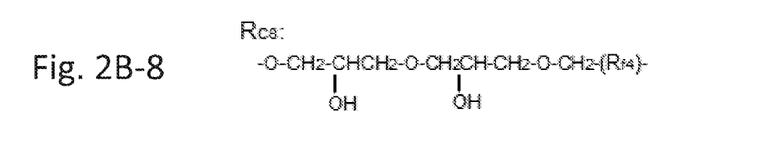
Figures 2B, 2B:
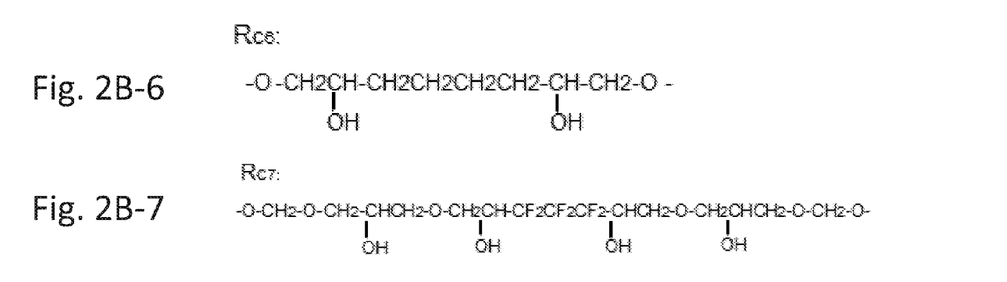
Figure 2B:
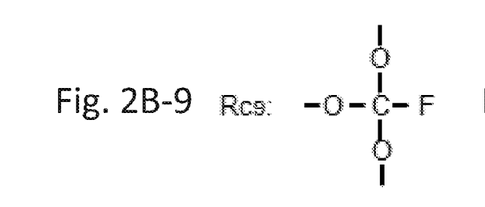
Figure 2B:
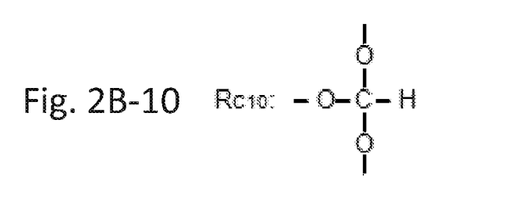
Figure 2B:
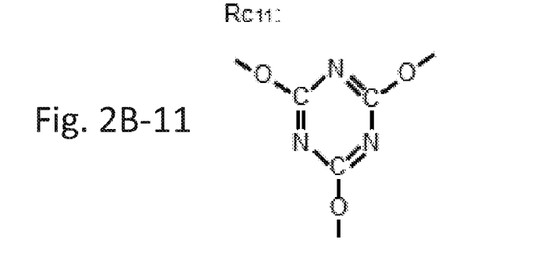
Figure 2B:
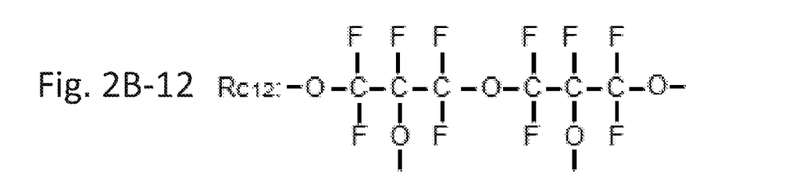
Figure 2B:
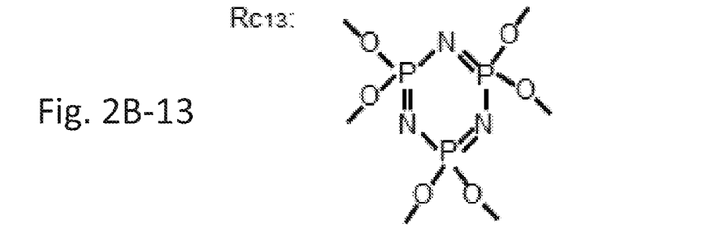
Figure 2B:
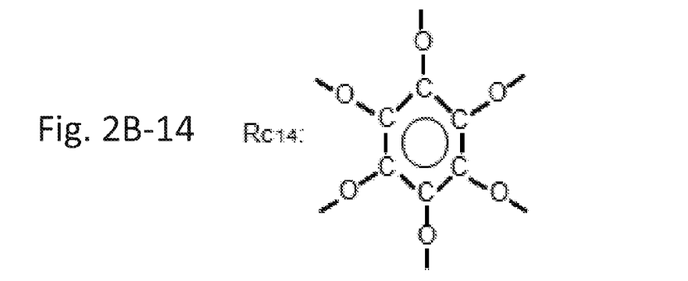
Figure 2C:
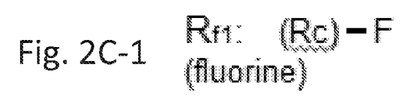
Figure 2C:
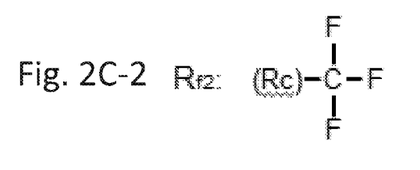
Figure 2C:
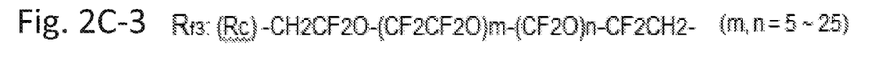
Figure 2C:
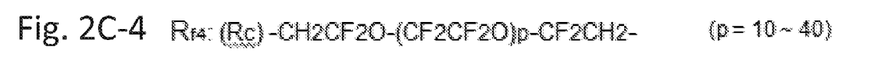
Figure 2C:
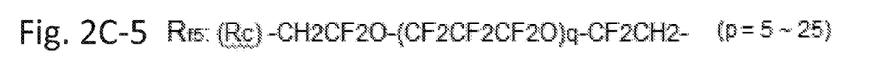
Figure 2C:
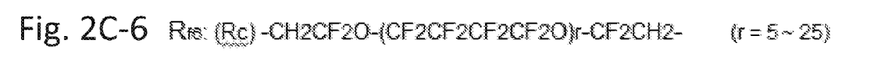
Figure 2C:
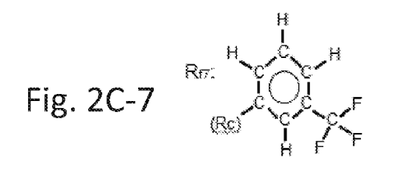
Figure 2D:
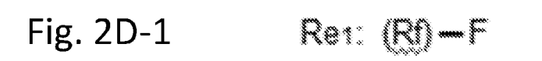
Figure 2D:
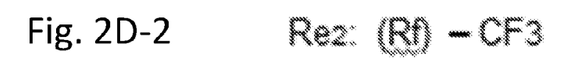
Figure 2D:
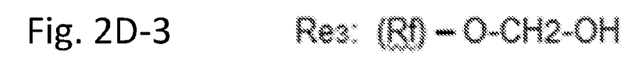
Figure 2D:
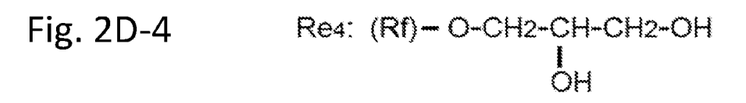
Figure 2D:
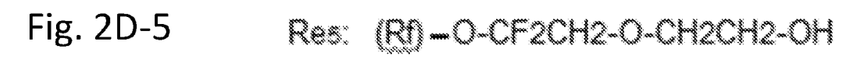
Figure 2D:
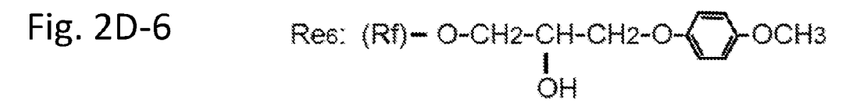

FIG. 1 is a schematic diagram illustrating an exemplary lubricated hard disk 100 in accordance with the present disclosure. Hard disk 100 comprises a magnetic recording layer 101, a carbon overcoat 102, and a double lubrication layer: bonded lubrication layer 103 and mobile lubrication layer 104. Hard disk 100 may be implemented in any high storage density HDD comprising a read/write head that reads and writes data to magnetic recording layer 101. In one embodiment the thickness of carbon overcoat layer 102 is between 10 Å and 30 Å.

In this exemplary embodiment, the two lubrication layers 103-104 comprise different lubricants. In one embodiment, the different lubricants are per-fluoro-poly-ether (PFPE) lubricants. Bonded lubrication layer 103 comprises a highly condensed and conformal lubricant for maximizing the available spacing margin and thereby lowering the DFH touch-down point. In one embodiment, the thickness of bonded lubrication layer 103 is between 5 Å and 10 Å. The thinness and uniformity of bonded lubrication layer 103 provides the benefit of allowing a close fly-by of the HDD head.

FIGS. 2A through 2D-6 illustrate molecular structures for exemplary PFPE lubricants that may be used in one embodiment of bonded lubrication layer 103. In this exemplary embodiment, the molecular structure 200 of bonded lubrication layer 103 comprises a functional end group 201, a center connection structure 202, and a fluorocarbon chain 203. These exemplary lubricants exhibit the property of a short branch length relative to conventional lubricants, thereby allowing for a smaller gyration diameter and lower physical thickness of bonded lubrication layer 103.

FIGS. 2B-1 through 2B-8 illustrate center connection structures 202 that may be used in 2-chain embodiments of molecular structure 200. FIGS. 2B-9 through 2B-11 illustrate center connection structures 202 that may be used in 3-chain embodiments of molecular structure 200. FIG. 2B-12 illustrates a center connection structure 202 that may be used in 4-chain embodiments of molecular structure 200. FIGS. 2B-13 through 2B-14 illustrate center connection structures 202 that may be used in 6-chain embodiments of molecular structure 200.

FIGS. 2C-1 through 2C-7 illustrate exemplary fluorocarbon chain structures 203 that may be used in embodiments of molecular structure 200. FIG. 2C-2, for example, illustrates a tri-fluoro methane molecular structure. FIG. 2C-7, for example, illustrates a tri-fluoro phenoxy benzene molecular structure. FIGS. 2D-1 through 2D-6 illustrate exemplary functional end groups 201 that may be used in embodiments of molecular structure 200.

Mobile lubrication layer 104 comprises a low friction and high durability lubricant for improving tribology performance of the HDD, i.e. preventing dragging of a read/write head on disk 100. The high lubricity of mobile lubrication layer 104 provides the benefit of minimizing the wear of carbon overcoat layer 102, which protects the magnetic recording layer 101 of disk 100. Moreover, the high lubricity of mobile lubrication layer 104 provides the benefit of minimizing HDD head carbon overcoat wear. In one embodiment, the thickness of mobile lubrication layer 104 is between 2 Å to 4 Å.

Figure 3A:
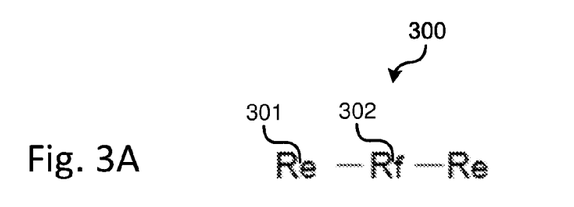
Figure 3B:
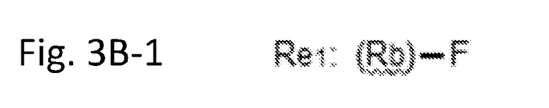
Figure 3B:
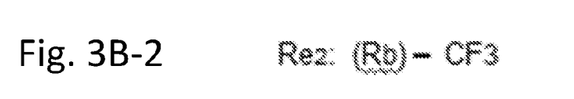
Figure 3B:
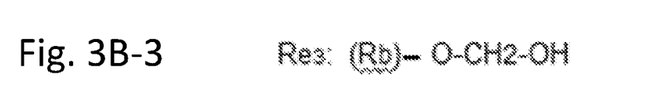
Figure 3B:
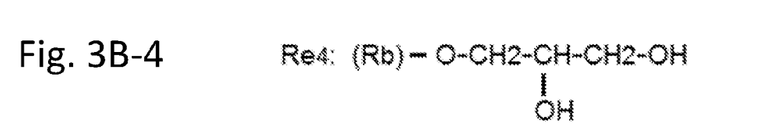
Figure 3B:
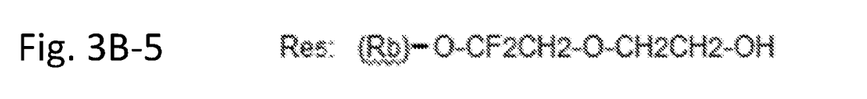
Figure 3B:
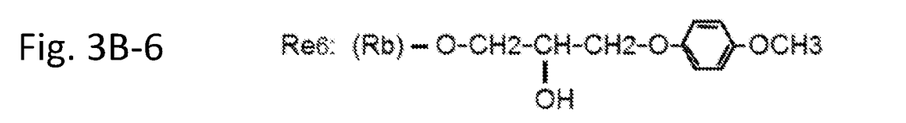

FIGS. 3A through 3B-6 illustrate molecular structures for exemplary lubricants that may be used as the lubricant in the mobile lubrication layer 104 of the hard disk of FIG. 1. In this exemplary embodiment, the molecular structure 300 of bonded lubrication layer 103 comprises a functional end group 301 and a fluorinated chain 302. FIGS. 3B-1 through 3B-6 illustrate exemplary functional end groups 301 that may be used in embodiments of molecular structure 300.

In one embodiment, bonded lubrication layer 103 and mobile layer 104 comprise the same PFPE lubricant but with different molecular weights (MW). For example, in one embodiment mobile layer 104 may comprise a higher MW version of the PFPE lubricant. This provides the benefit of preventing the loss of mobile lubrication by evaporation during drive operations at high temperatures. In this embodiment, bonded lubrication layer 103 may comprise a lower MW version of the PFPE lubricant for a thin and conformal lubrication layer structure.

Figure 4:
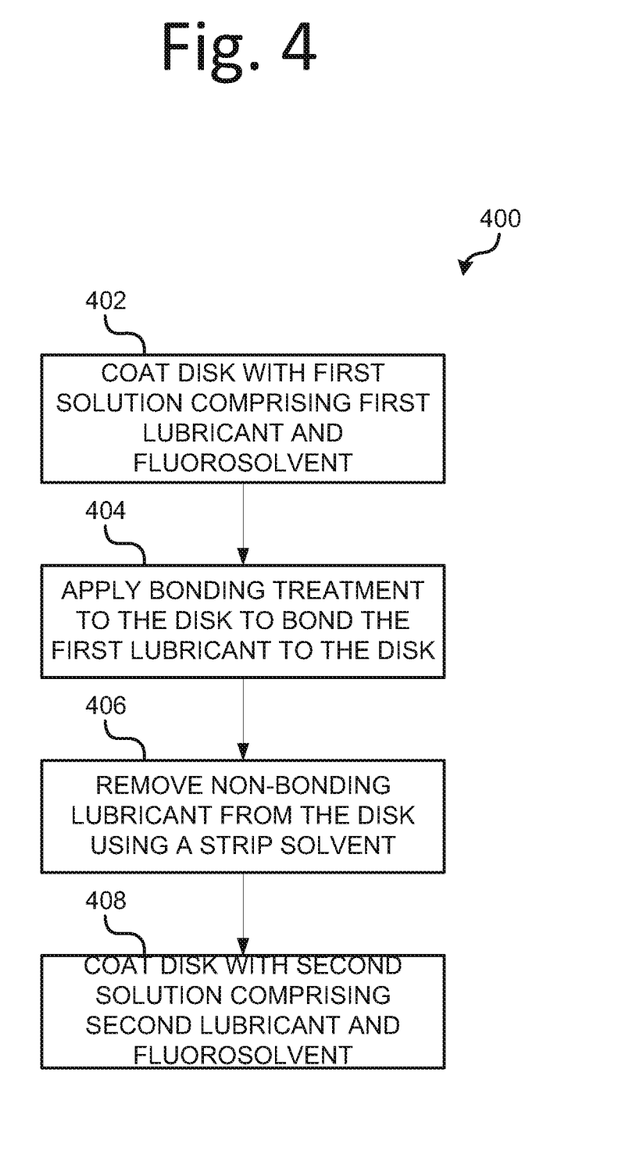
FIG. 4 is an operational flow diagram illustrating an exemplary dipping lubrication process for manufacturing the lubricated disk of FIG. 1.
Figure 5:
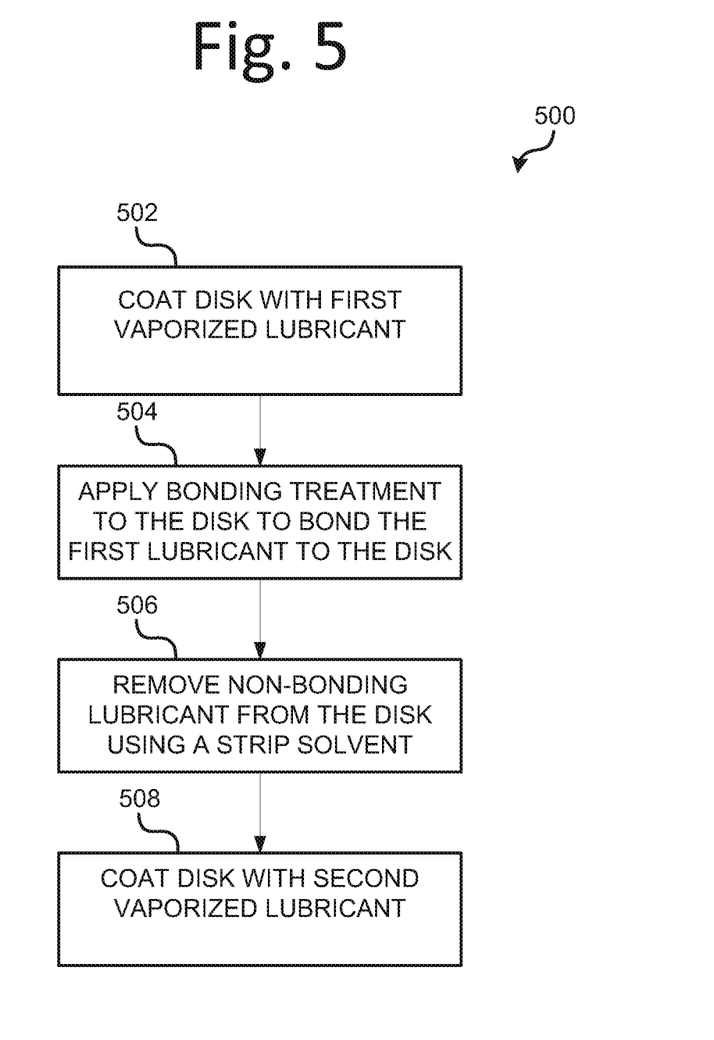
FIG. 5 is an operational flow diagram illustrating a vaporization lubrication process for manufacturing the lubricated disk of FIG. 1.

FIGS. 4-5 are operational flow diagrams illustrating exemplary processes for manufacturing lubricated disk 100. In both processes, a sputtered magnetic disk with magnetic recording layer 101 and carbon overcoat 102 is provided prior to lubrication. FIG. 4 illustrates an exemplary dipping lubrication process 400 for manufacturing lubricated disk 100. At operation 402, the disk is coated with a first solution comprising a first lubricant and a fluorosolvent. In this exemplary dipping lubrication process 400, operation 402 is performed by dipping the disk in the first solution and removing the disk from the first solution at a predetermined speed, for example, 1 to 2 mm/second. In one embodiment, the fluorosolvent has a concentration of 0.01-0.02 wt %.

At operation 404, a bonding treatment is applied to the disk to bond the first lubricant to the disk, thereby creating the first lubrication layer, bonded lubrication layer 103. The bonding treatment increases the bonding strength between the lubricant molecules and the carbon overcoat 102. In one embodiment, the bonding treatment comprises exposing the disk to ultraviolet (UV) light. For example, the disk may be exposed to a low-pressure Mercury UV lamp between 20 and 40 seconds. In an alternative embodiment, the bonding treatment comprises heating the disk in a chamber above a predetermined temperature, for example 100 C. The second lubrication layer may then be formed at operations 406-408.

Before coating the disk with a second lubricant after bonding operation 404, any non-bonding lubricant may be removed at operation 406. This removal process provides the benefit of preventing mixing of non-bonded first lubricant with the second lubricant, thereby maximizing the effect of the second lubricant. Moreover, operation 406 provides the benefit of keeping the subsequent coating process contamination free. In one embodiment, non-bonded lubricant is removed or stripped using a stripping solvent. For example, the disk may be soaked in fluorinated solvent for 5 to 10 minutes to dissolve un-bonded first lubricant material into the solvent. After soaking, the disk may be removed from the solvent at a predetermined speed, for example, 1 to 2 mm/second.

At operation 408, the disk is coated with a second solution comprising a second lubricant and a fluorosolvent. In exemplary dipping lubrication process 400, operation 408 is performed by dipping the disk in the second solution and removing the disk from the first solution at a predetermined speed (e.g. 1 to 2 mm/second), thereby creating a second lubrication layer, mobile layer 104. In one embodiment, the fluorosolvent has a concentration of 0.01-0.02 wt %.

FIG. 5 is an operational flow diagram illustrating an exemplary vaporization lubrication process 500 for manufacturing lubricated disk 100. At operation 502, the disk is coated with a first lubricant by applying a vapor lubrication process. In one exemplary implementation of the vapor lubrication process, a high conformity lubricant is coated on the disk without solvent by vaporizing the lubricant via direct heating inside a vacuum chamber. The first lubricant may then be bonded to the disk's carbon overcoat 102 at operation 504 by applying a bonding treatment (as described above) to the disk to bond the first lubricant to the disk, thereby creating the first lubrication layer, bonded lubrication layer 103.

At operation 506, prior to coating the disk with a second lubricant via a second vaporization process, any non-bonding first lubricant is removed using any suitable removal process such as for example, the strip removal process described above in operation 406. The disk is then coated with a second lubricant at operation 508 by applying a vapor lubrication process. In one exemplary implementation of the vapor lubrication process, a high lubricity lubricant is coated on the disk without solvent by vaporizing the lubricant via direct heating inside a vacuum chamber. A second lubrication layer, mobile layer 104, is thereby creating.

In alternative embodiments, a combination of dipping and vaporization processes may be implemented in the manufacture of the double lubrication layer (e.g. dipping to create first lubrication layer and vaporization to create second lubrication layer or vice-versa). In yet other embodiments, the disk may comprise more than two lubrication layers, whereby the plurality of lubrication layers improve the head touchdown point and overall HDI reliability.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

What is claimed is:

1. A hard disk lubrication layer, comprising:

a first lubrication layer bonded on a carbon overcoat of the hard disk, the first lubrication layer comprising a lubricant with chemical structure:

$m, n = 1\sim6$
$m + n = p$ wherein Rc is a center connection structure with a connection number p, Re is a functional end group, and Rf is a fluorocarbon chain; and a second lubrication layer on the first lubrication layer, wherein the second lubrication layer is a mobile layer comprising a lubricant with chemical structure:

wherein Re is a functional end group and Rf is a fluorinated chain;

wherein the first lubrication and the second lubrication layer comprise different lubricants;

wherein the center connection structure Rc is selected from the group consisting of (Rc1 through Rc14):

wherein the fluorocarbon chain Rf of the first lubrication layer is selected from the group consisting of (Rf3 through Rf6):

$(R_c)$—$CH_2CF_2O$—$(CF_2CF_2O)_m$—$(CF_2O)_n$—
$CF_2CH_2$— $(m,n=5\sim25)$  $R_{f3}$:

$(R_c)$—$CH_2CF_2O$—$(CF_2CF_2O)_p$—$CF_2CH_2$—
$(p=10\sim40)$  $R_{f4}$:

$(R_c)$—$CH_2CF_2O$—$(CF_2CF_2CF_2O)_q$—$CF_2CH_2$—
$(p=5\sim25)$  $R_{f5}$:

$(R_c)$—$CH_2CF_2O$—$(CF_2CF_2CF_2CF_2O)_r$—$CF_2CH_2$—
$(r=5\sim25)$  $R_{f6}$:

wherein the functional end group Re of the lubricant of the first lubrication layer is selected from the group consisting of (Re1 through Re6):

Re1: (Rf)—F    Re2: (Rf)—$CF_3$    Re3: (Rf)—O—$CH_2$—OH

Re4: (Rf)—O—$CH_2$—CH—$CH_2$—OH
                    |
                   OH

Re5: (Rf)—O—$CF_2CH_2$—O—$CH_2CH_2$—OH wherein the functional end group Re of the lubricant of the second lubrication layer is selected from the group consisting of (Re1 through Re6):

2. The hard disk lubrication layer of claim 1, wherein the first lubrication layer comprises per-fluoro-poly-ether (PFPE) lubricant.

3. The hard disk lubrication layer of claim 1, wherein the thickness of the first lubrication layer is 5 Å to 10 Å.

4. The hard disk lubrication layer of claim 1, wherein the thickness of the second lubrication layer is 2 Å to 4 Å.

5. A hard disk drive comprising:
a disk drive base;
a spindle motor attached to the disk drive base and configured to support a disk for rotating the disk with respect to the disk drive base surface; and
a rotatable disk, comprising:
a carbon overcoat on a magnetic recording layer;
a first lubrication layer bonded on a carbon overcoat of the hard disk, the first lubrication layer comprising a lubricant with chemical structure:

$$(Re)m\text{---}(Rc)\text{---}(Rf\text{---}Re)n$$

$m, n = 1\sim6$
$m + n = p$ wherein Rc is a center connection structure with a connection number p, Re is a functional end group, and Rf is a fluorocarbon chain; and
a second lubrication layer on the first lubrication layer, wherein the second lubrication layer is a mobile layer comprising a lubricant with chemical structure:

Re—Rf—Re wherein Re is a functional end group and Rf is a fluorinated chain; and
wherein the first lubrication and the second lubrication layer comprise different lubricants;
wherein the center connection structure Rc is selected from the group consisting of (Rc1 through Rc14):

wherein the fluorocarbon chain Rf of the first lubrication layer is selected from the group consisting of (Rf3 through Rf6):

$(R_c)-CH_2CF_2O-(CF_2CF_2O)_m-(CF_2O)_n-CF_2CH_2-$ $(m,n=5\sim25)$     $R_{f3}$:

$(R_c)-CH_2CF_2O-(CF_2CF_2O)_p-CF_2CH_2-$ $(p=10\sim40)$     $R_{f4}$:

$(R_c)-CH_2CF_2O-(CF_2CF_2CF_2O)_q-CF_2CH_2-$ $(p=5\sim25)$     $R_{f5}$:

$(R_c)-CH_2CF_2O-(CF_2CF_2CF_2CF_2O)_r-CF_2CH_2-$ $(r=5\sim25)$     $R_{f6}$:

wherein the functional end group Re of the lubricant of the first lubrication layer is selected from the group consisting of (Re1 through Re6):

Re1: (Rf)—F    Re2: (Rf)—CF$_3$    Re3: (Rf)—O—CH$_2$—OH

Re4: (Rf)—O—CH$_2$—CH(OH)—CH$_2$—OH

Re5: (Rf)—O—CF$_2$CH$_2$—O—CH$_2$CH$_2$—OH

Re6: (Rf)—O—CH$_2$—CH(OH)—CH$_2$—O—⟨C$_6$H$_4$⟩—OCH$_3$ wherein the functional end group Re of the lubricant of the second lubrication layer is selected from the group consisting of (Re1 through Re6):

Re1: —F    Re2: —CF$_3$    Re3: —O—CH$_2$—OH

Re4: —O—CH$_2$—CH(OH)—CH$_2$—OH

Re5: —O—CF$_2$CH$_2$—O—CH$_2$CH$_2$—OH

Re6: —O—CH$_2$—CH(OH)—CH$_2$—O—⟨C$_6$H$_4$⟩—OCH$_3$.

6. The hard disk drive of claim 5, wherein the first lubrication layer comprises per-fluoro-poly-ether (PFPE) lubricant.

7. The hard disk drive of claim 5, wherein the thickness of the first lubrication layer is 5 Å to 10 Å.

8. The hard drive of claim 5, wherein the thickness of the second lubrication layer is 2 Å to 4 Å.

9. A method of lubricating a hard disk comprising a carbon overcoat, comprising:
creating a first lubrication layer on top of the carbon overcoat, the first lubrication layer comprising a lubricant with chemical structure:

$$(Re)m-(Rc)-(Rf-Re)n$$
$m, n = 1\sim6$
$m + n = p$ wherein Rc is a center connection structure with a connection number p, Re is a functional end group, and Rf is a fluorocarbon chain; and
creating a second lubrication layer on top of the first lubrication layer wherein the second lubrication layer is a mobile layer comprising a lubricant with chemical structure:

Re—Rf—Re wherein Re is a functional end group and Rf is a fluorinated chain; and
wherein the first lubrication and the second lubrication layer comprise different lubricants;
wherein the center connection structure Rc is selected from the group consisting of (Rc1 through Rc14):

-continued wherein the fluorocarbon chain Rf of the first lubrication layer is selected from the group consisting of (Rf3 through Rf6):

$R_{f3}$:

$R_{f4}$:

$R_{f5}$:

$R_{f6}$:

wherein the functional end group Re of the lubricant of the first lubrication layer is selected from the group consisting of (Re1 through Re6):

wherein the functional end group Re of the lubricant of the second lubrication layer is selected from the group consisting of (Re1 through Re6):

10. The method of claim 9, wherein creating the first lubrication layer comprises:
   coating the disk with a first solution comprising a first lubricant and a fluorosolvent; and
   applying a bonding treatment to the disk to bond the first lubricant to the disk.

11. The method of claim 10, wherein coating the disk with the first solution comprises:
   dipping the disk into the first solution; and
   removing the disk from the first solution at a first predetermined speed.

12. The method of claim 11, wherein applying a bonding treatment comprises exposing the disk to UV light or heating the disk in a chamber.

13. The method of claim 11, wherein creating the second lubrication layer comprises:
   removing the non-bonding first lubricant from the disk using a strip solvent; and
   coating the disk with a second solution comprising a second lubricant and a fluorosolvent.

14. The method of claim 13, wherein coating the disk with the second solution comprises:
   dipping the disk into the second solution; and
   removing the disk from the second solution at a second predetermined speed.

15. The method of claim 14, wherein the first and second predetermined speeds are between 1 mm/second and 2 mm/second.

16. The method of claim 9, wherein the disk is a sputtered magnetic disk and the thickness of the carbon overcoat is between 10 Å and 30 Å.

17. The method of claim 9, wherein creating the first lubrication layer comprises:
   coating the disk with a vaporized first lubricant; and
   applying a bonding treatment to the disk to bond the first lubricant to the disk; and wherein creating the second lubrication layer comprises:
   removing the non-bonding first lubricant from the disk using a strip solvent; and
   coating the disk with a vaporized second lubricant.

* * * * *